United States Patent [19]
Guinosso

[11] Patent Number: 5,619,370
[45] Date of Patent: Apr. 8, 1997

[54] OPTICAL SYSTEM FOR VIEWING A REMOTE LOCATION

[76] Inventor: Patrick J. Guinosso, Bldg. 26 Apt. B7 700 Lower State Rd., North Wales, Pa. 19454

[21] Appl. No.: 218,643

[22] Filed: Mar. 28, 1994

[51] Int. Cl.$^6$ .................. G02B 23/36; G02B 23/00; G02B 7/00; G02B 9/00
[52] U.S. Cl. .................. 359/362; 359/400; 359/739; 359/749; 359/503; 385/118; 385/119
[58] Field of Search .................. 385/116, 119, 385/118; 359/400, 362, 402, 503, 739, 749

[56] References Cited

U.S. PATENT DOCUMENTS

| | | | |
|---|---|---|---|
| 2,375,887 | 5/1945 | Barden | 359/400 |
| 2,738,753 | 3/1956 | Eubank | 116/57 |
| 3,020,806 | 2/1962 | Castrucci | 359/806 |
| 3,679,297 | 7/1972 | Searle et al. | 353/14 |
| 3,897,144 | 7/1975 | Hicks | 353/11 |
| 3,952,319 | 4/1976 | Hirata et al. | 354/109 |
| 4,000,419 | 12/1976 | Crost et al. | 250/214 VT |
| 4,390,253 | 6/1983 | Lobb | 350/505 |
| 4,709,985 | 12/1987 | Takeeuchi | 385/119 |
| 4,831,366 | 5/1989 | Iino | 340/705 |
| 4,908,611 | 3/1990 | Iino | 340/705 |
| 4,969,707 | 11/1990 | Hopkins | 385/116 |
| 5,024,523 | 6/1991 | Jerie | 353/11 |
| 5,037,182 | 8/1991 | Groves et al. | 359/630 |
| 5,070,323 | 12/1991 | Iino et al. | 340/705 |
| 5,099,229 | 3/1992 | Aoki | 340/705 |
| 5,170,153 | 12/1992 | Migozzi et al. | 340/705 |
| 5,229,755 | 7/1993 | Aoki | 340/705 |

FOREIGN PATENT DOCUMENTS

| | | | |
|---|---|---|---|
| 2623294 | 5/1989 | France | 385/116 |
| 0045234 | 3/1984 | Japan | 385/119 |
| 0195446 | 11/1984 | Japan | 385/118 |
| 9107295 | 5/1991 | WIPO | 385/119 |

Primary Examiner—Paul M. Dzierzynski
Assistant Examiner—Mohammad Y. Sikder
Attorney, Agent, or Firm—LaMorte & Associates

[57] ABSTRACT

An optical apparatus that enables an object at a first location to be viewed from a second remote location. The optical apparatus includes at least one objective lens assembly that views the object at the first location. The objective lens assembly focuses the viewed image onto the input plane of an image conduit. The fiber optic conduit propagates the image to the second remote location, wherein the image is projected from the image conduit onto the back surface of a substantially transparent planar member. The back surface of the planar member is not highly polished. As a result, the image projected onto the back surface does not pass directly through the planar member. The reflections caused by the unpolished nature of the surface allow the image to be viewed on the back surface of the planar member through the body of the planar member.

11 Claims, 5 Drawing Sheets

OPTICAL SYSTEM FOR VIEWING A REMOTE LOCATION

BACKGROUND OF THE INVENTION

1. Field of the Invention

The present invention relates to optical devices and systems that utilize an image conduit to propagate a an image viewed by an objective lens assembly at a remote location to a viewing screen at a central location. More particularly, the present invention relates to an optical assembly that is adaptable to automobiles and enables the driver of the automobile to view the blind spots of the automobile through a display.

2. Prior Art Statement

It is well known that when a driver is driving a vehicle in reverse, the driver's ability to view objects behind the car are severely limited by the driver's orientation, the size of the rear windshield and the bulk of the rearward portions of the automobile. As a result, drivers who are backing up their automobiles often strike objects, and sometimes children, that they do not see. Similar areas of poor visibility often cause accidents while the driver is changing lanes, parking and performing other maneuvers. The long felt problem of not being able to see into the blind spots around an automobile has been in existence since the advent of the automobile. As a result, many different devices have been developed over the years in an attempt to solve this problem. For instance, most modern automobiles typically come equipped with a rearview mirror in the center of the front windshield and two external rearview mirrors on either side of the exterior of the automobile. Such mirror arrangements help a driver see behind portions of the automobile not normally visible, but still leave significant blind spots where a child or object can be hidden.

The typical high-tech approach to solving the problem of viewing around an automobile has been to equip automobiles with sonar or radar systems on their rear bumpers. Such systems electronically detect the presence of objects or children behind the automobile and typically inform the driver of the presence of the object by flashing a warning light. Such electronic sensing systems are very expensive. Additionally, the functional use of such systems is limited because such systems merely inform the driver of the presence of an object and do not enable the driver to view the object and therefore steer clear of that object.

Yet another electronic solution to the problem of viewing behind an automobile has appeared in several concept car prototypes. This solution utilizes a small television camera that is mounted to the rear of an automobile. The camera is electrically coupled to an electronic display on the dashboard of the automobile, wherein the driver need only look toward the electronic display to view what is behind the automobile. Such camera systems can eliminate all blind spots behind an automobile, however, such systems are prohibitively expensive, requiring expensive cameras and electronic display equipment to be manufactured into the automobile.

The present invention system improves greatly upon the prior art by providing an optical system whereby the driver of an automobile may view the areas around an automobile, eliminating many blind spots, in a cost effective manner. As will be later explained, the preferred embodiment of the present invention system utilizes an image conduit to connect an objective lens at the rear of the car to a head-up display within the automobile that is easily viewed by the driver.

The prior art is replete with head-up displays for automobiles and other vehicles. Typically, the image provided for the head-up display is electronically generated, thereby requiring an electronic imaging device, such a as a cathode ray tube or a charged coupled device, and a means to project the electronically generated image onto the head-up display. Such prior art systems are exemplified by U.S. Pat. No. 5,037,182 to Groves et al., entitled REARVIEW MIRROR HEAD-UP DISPLAY and U.S. Pat. No. 5,070,323 to Iino et al., entitled DISPLAY FOR VEHICLE, both of which utilize rearview mirror type structures to present the head-up display.

The use of fiber optic conduits to propagate an image between optical elements is also practiced in many fields of endeavor. Examples of such include endoscopes that are used within the medical field. Fiber optic conduits are also used in electronic head-up displays as shown by U.S. Pat. No. 5,170,153 to Migozzi et al., entitled OPTICAL DEVICE FOR THE DISPLAY OF LIGHT DATA COLLIMATED TO INFINITY. However, these prior art systems either convert a viewed image into an electronic image (i.e. endoscopes) or are used to transmit an electronically generated image over a real image (i.e. electronic head-up display). As a result, these systems cannot be economically adapted for use in viewing the area behind an automobile.

A need therefore exists in the prior art for a low cost optical arrangement that enables the driver of an automobile to view the areas around his/her automobile, thereby eliminating the dangerous blind spots.

It is therefore the object of the present invention to provide such a system wherein the image corresponding to the areas around the automobile are displayed in an easily viewed location within the automobile without the need for an electronic display or electronic projection device.

SUMMARY OF THE INVENTION

The present invention is an optical apparatus that enables an object at a first location to be viewed from a second remote location. The optical apparatus includes at least one objective lens assembly that views the image of the object at the first location. The objective lens assembly focuses the viewed image onto the input plane of an image conduit. The image conduit travels to the second remote location, wherein the image is projected from the image conduit onto the back surface of a substantially transparent planar member. The back surface of the planar member is not highly polished. As a result, the image projected onto the back surface does not pass directly through the planar member. The reflections caused by the unpolished nature of the surface allow the image to be viewed at the back surface of the planar member by looking through the body of the planar member.

In a preferred embodiment the present invention optical apparatus is adapted to an automobile, whereby the apparatus helps a driver view areas around the automobile that are not normally within the driver's field of view. In such an application, the objective lens assembly is positioned toward a target area proximate the automobile and the image viewed by the objective lens assembly is directed into the rearview mirror assembly of the automobile as an internal display. The image is propagated from the remote objective lens assembly to the rearview mirror assembly by the image conduit. Once at the rearview mirror assembly, the image is projected from the image conduit onto the back surface of the mirror plate. As a result, the image viewed by the remote objective lens assembly can be seen by looking into the rearview mirror assembly.

BRIEF DESCRIPTION OF THE DRAWINGS

The invention will be more fully understood by referring to the following detailed specification, the above background and the claims set forth herein, when taken in connection with the drawings appended hereto.

DETAILED DESCRIPTION OF THE INVENTION

Although the present invention can be used in many applications, wherein it is desirable to view an object at a remote location, such as doorway peep holes and the like, the present invention is especially suited for use in viewing the areas behind an automobile. Accordingly, the present invention will be primarily described below in an automobile application for the purposes of expressing the best mode of the invention.

Figure 1:
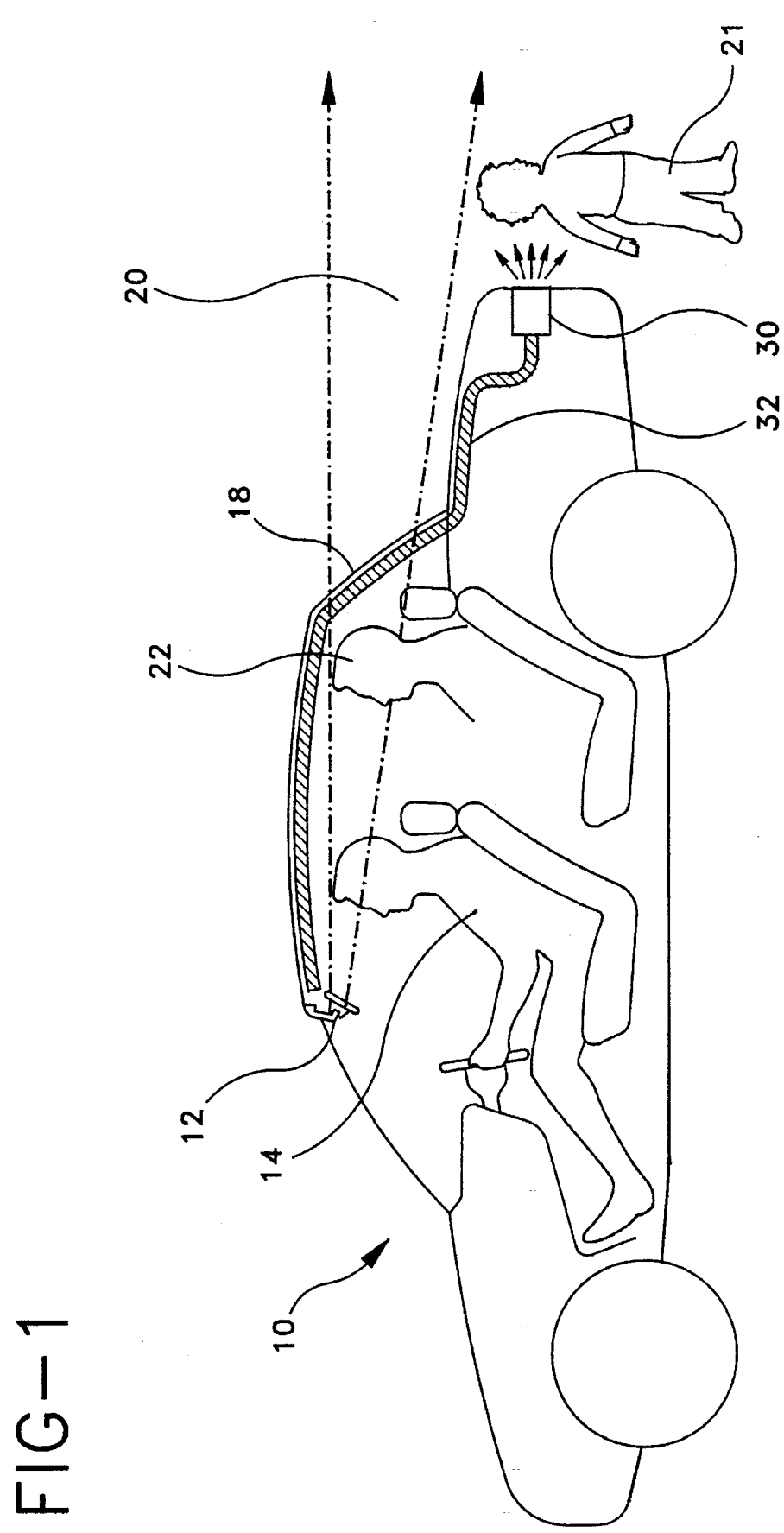
FIG. 1 shows one preferred embodiment of the present invention optical apparatus in conjunction with a passenger automobile to illustrate a preferred application and show desired orientations, thereby facilitating further consideration and discussion.

Referring to FIG. 1, there is shown a simple diagram of an automobile 10 having a rearview mirror assembly 12. As the driver 14 of the automobile 10 drives the automobile 10 in reverse, the driver 14 typically either turns to look out the rear windshield 18 or looks into the rearview mirror assembly 12. In either situation, the driver 14 is only capable of viewing objects within a specific field of view 20 that is determined by the size of the driver, the size of the rear windshield and the bulk of the rearward portions of the automobile. A blind spot occurs either below the field of view 20 in which a child 21 may be present. Additionally, if the automobile 10 contains rear seat passengers 22, the field of view 20 is greatly reduced and the driver 14 may be unable to view even large objects, such as other cars, that may normally be within his/her field of view.

The present invention optical apparatus includes at least one objective lens assembly 30 mounted on the automobile 10 in a position so that the objective lens assembly 30 views the areas outside the field of view 20 that cannot be otherwise viewed by the driver 14. Image conduit 32 couples the objective lens assembly 30 to the rearview mirror assembly 12, wherein the image viewed by the objective lens assembly 30 is transferred to the rearview mirror assembly 12 and the image is superimposed over the normal reflected image of the rearview mirror assembly 12 as a head-up display. As a result, the driver 14 can look into the rearview mirror assembly 12 in order to observe what is behind the automobile, thereby eliminating the blind spots. In the shown embodiment, the objective lens assembly 30 is mounted proximate the rear bumper of the automobile 10. However, such a position is merely exemplary and it will be understood that the objective lens assembly 30 can be positioned anywhere on the automobile 10 where it is capable of enhancing the driver's vision.

Figure 2:
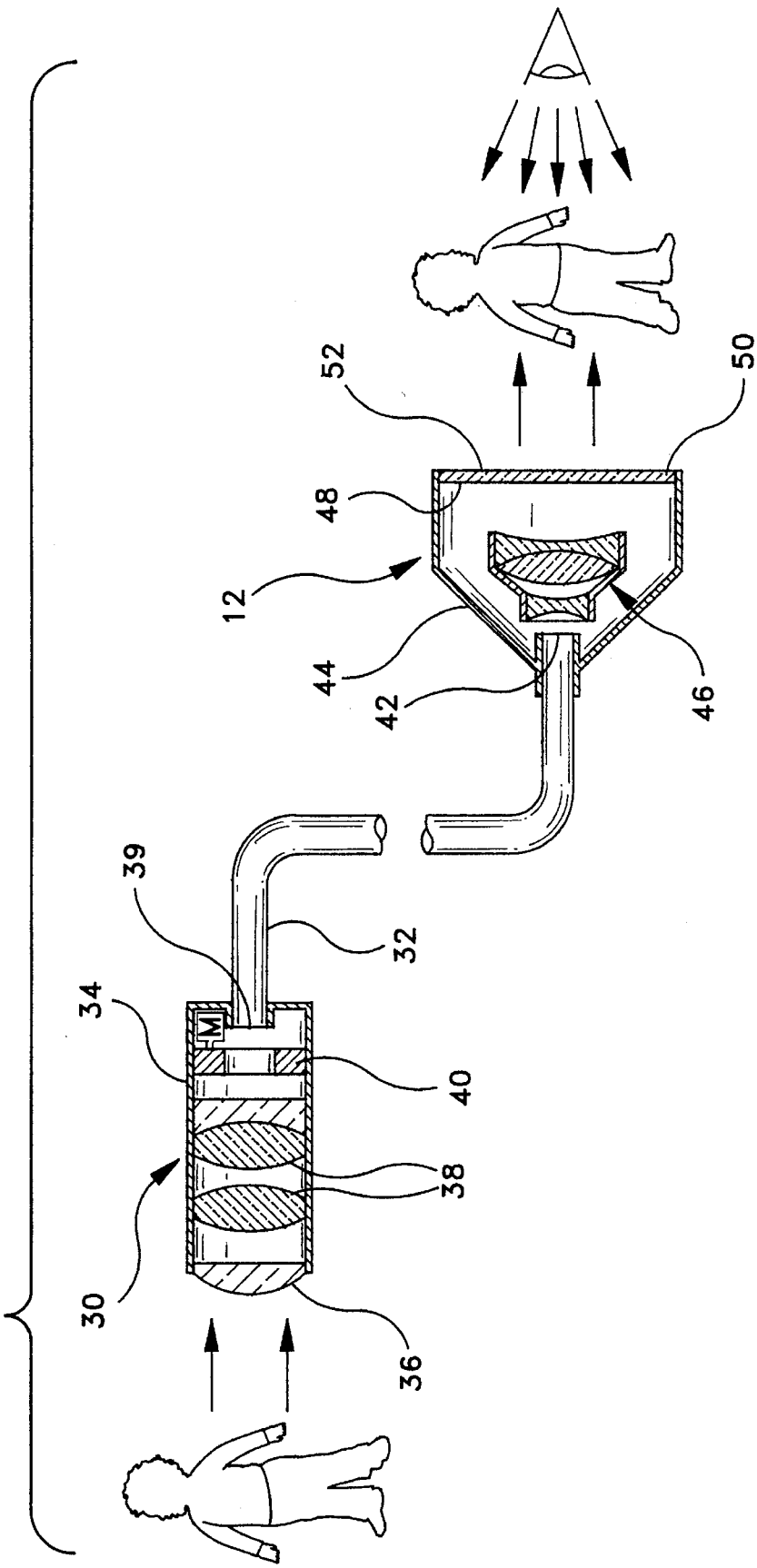
FIG. 2 shows a cross-sectional view of one preferred embodiment of the present invention optical apparatus having a single objective lens assembly.

Referring to FIG. 2, it can be seen that in a first preferred arrangement, the objective lens assembly 30 includes a lens arrangement contained within a housing 34. The lens arrangement is comprised of an objective lens 36 and focusing lenses 38. The objective lens 36 is preferably a wide angle lens having a field of view great enough to cover the blind spot of the automobile on which the present invention optical system is mounted. The focusing lenses 38 focus the image passing through the objective lens 36 onto the input plane 39 of the image conduit 32. The input plane 39 of the image conduit 32 is held at a fixed position by the housing 34, as are the objective lens 36 and the focusing lenses 38. The objective lens assembly 30 may also include additional lenses, as desired, to magnify, reduce and/or invert the impinging image before that image is focused onto the input plane 39 of the image conduit 32.

In the shown embodiment, an optional electrically operated optical diaphragm 40 is also present within the housing 34 of the objective lens assembly 30. The optical diaphragm 40 is an adjustable aperture capable of moving between an open condition and a closed condition. The optical diaphragm 40 is preferably an adjustable iris, controlled by a motor, wherein light is able to pass through the iris when in the open condition and light is obscured when the iris is in the closed condition. The optical diaphragm 40 can be any known device, such as the preferred electrically controlled iris, however, other optical components such as a liquid crystal shutter device can be used that can be electrically controlled to selectively block the passage of light through an optical system. Although the optical diaphragm 40 can be manually operated by the driver of the automobile, in a preferred embodiment, the optical diaphragm 40 is electrically controlled and is coupled to the reverse light circuit of the automobile. In such a preferred arrangement, the electrically controlled optical diaphragm 40 is in its open condition only when the automobile is placed in reverse. This embodiment is preferred because the driver only needs to see what is behind the automobile when the automobile is in reverse. Additionally, such an electrical control prevents the driver from being blinded by rearwardly approaching headlights when the automobile is not in reverse. However, it will be understood that the optical diaphragm 40 need not be present. As such, the driver can view blind spots even when the automobile is travelling forward. This enables the driver to better see the areas surrounding the automobile for the purposes of passing, parking and the like.

The image focused upon the input plane 39 of the image conduit 32 is propagated along the length of the image conduit 32 to the output image plane 42 at the far end of the image conduit 32. In a preferred embodiment, the image conduit is a fiber optic conduit which is comprised of a bundle of commercially available fiber optic strands. The number of strands in the fiber optic conduit is dependent upon the desired resolution of the viewed image. The more strands present in the bundle, the greater the resolution of any image propagated across the conduit. It should also be noted that if the image directed upon the input plane 39 of the fiber optic conduit is inverted in a undesired orientation, the fiber optic conduit can be rotated 180 degrees along its length so as to upright the image as it leaves the output image plane 42. Although the use of fiber optics is the most economical way to form an image conduit, any other known image conduit may also be used within the scope of this invention.

The end of the image conduit 32 that contains the output image plane 42 terminates within the rearview mirror assembly 12. The rearview mirror assembly 12 includes a housing 44 that mounts to an automobile's interior at a point above the center of the windshield in a typical, well known fashion. The image conduit 32 connects to the housing 44, whereby the output image plane 42 of the image conduit 32 is held at a set position in relation to the housing 44. The light emitted from the output image plane 42 of the image conduit 32 impinges upon a focusing lens arrangement 46. The focusing lens arrangement 46 focuses the emitted image onto the back surface 48 of the mirror plate 50. The focusing lens arrangement 46 may also include any magnifying lenses needed to properly proportion the emitted image onto the mirror plate 50. It will also be understood that additional lenses may be contained within the rearview mirror assembly 12, should the emitted image need to be inverted prior to viewing. Similarly, the emitted image may be reflected off a mirror (not shown) in the housing 44 prior to being directed onto the focusing lens arrangement 46. Such a reflection would provide any needed left-right inversion corrections that may have to be made depending upon the lens arrangement within the objective lens assembly 30.

The mirror plate 50 has an unpolished or semi-polished back surface 48 upon which the image from the focusing lens arrangement 46 impinges. The front surface 52 of the mirror plate 50 is polished and may be coated with a semi-reflective material, thin reflective material or other reflective material that is semi-transparent when lit from behind. When no light is transmitted through the image conduit 32, the interior of the housing 44 of the rearview mirror assembly 12 is dark. As such, the mirror plate 50 acts as an ordinary reflective rearview mirror, such as those found in most any automobile. However, when the driver is backing up the automobile and the present invention optical system is activated, light is transmitted into the housing 44 of the rearview mirror assembly 12, via the objective lens assembly 30 and the image conduit 32. The light emitted into the rearview mirror assembly 12 provides some back lighting to the mirror plate 50, thereby causing the mirror plate 50 to become at least partially translucent. The focusing lens arrangement 46 focuses the light that is emitted from the image conduit 32 onto the unpolished or semi-polished back surface 48 of the mirror plate 50. The unpolished texture of the back surface 48 tends to retain the image projected onto it by the focusing lens arrangement 46. As a result, the image passed through the image conduit 32 appears at the back surface 48 of the mirror plate 50. As the driver looks into the mirror plate 50 of the rearview mirror assembly 12, the driver can see the image projected onto the back surface 48 of the mirror plate 50, thereby providing the driver with an image that corresponds to the area behind the driver's automobile.

A person familiar with the rearview mirror assemblies of automobiles will recognize that many modern assemblies include levers that position the mirror plate between a fully reflective high glare position, for daytime driving, and a partially reflective low glare position for nighttime driving. Such an adjustment can readily be added to the rearview mirror assembly of FIG. 2 by a person skilled in the art. However, since the present invention systems call for a mirror plate that is semi-transparent when back-lit, it would be beneficial to position the focusing lens arrangement 46 in the housing 44 so that the emitted light is focused onto the mirror plate 50 when the mirror plate is adjusted to its partially reflective low glare position. This would make the mirror plate 50 easier to back light and would make the projected image more easily viewed by the driver.

In an alternate embodiment, if the driver wants the option of constantly viewing blind spots, the optics that produce the viewed image need not be built into the rearview mirror assembly. Rather a second display can be added to the automobile that contains the needed optics. As such, the rearview mirror assembly can be used in the normal fashion and the second display can be used to view the various blind spots. It will be understood, however, that if the display is not made as part of the rearview mirror assembly, the mirror plate 50 shown in FIG. 2 need not be a mirror plate, but rather could just be a translucent plate without the reflective coating needed to produce a mirror. As a result, only the projected image would be viewed in the display without unnecessary reflected images.

Figure 3:
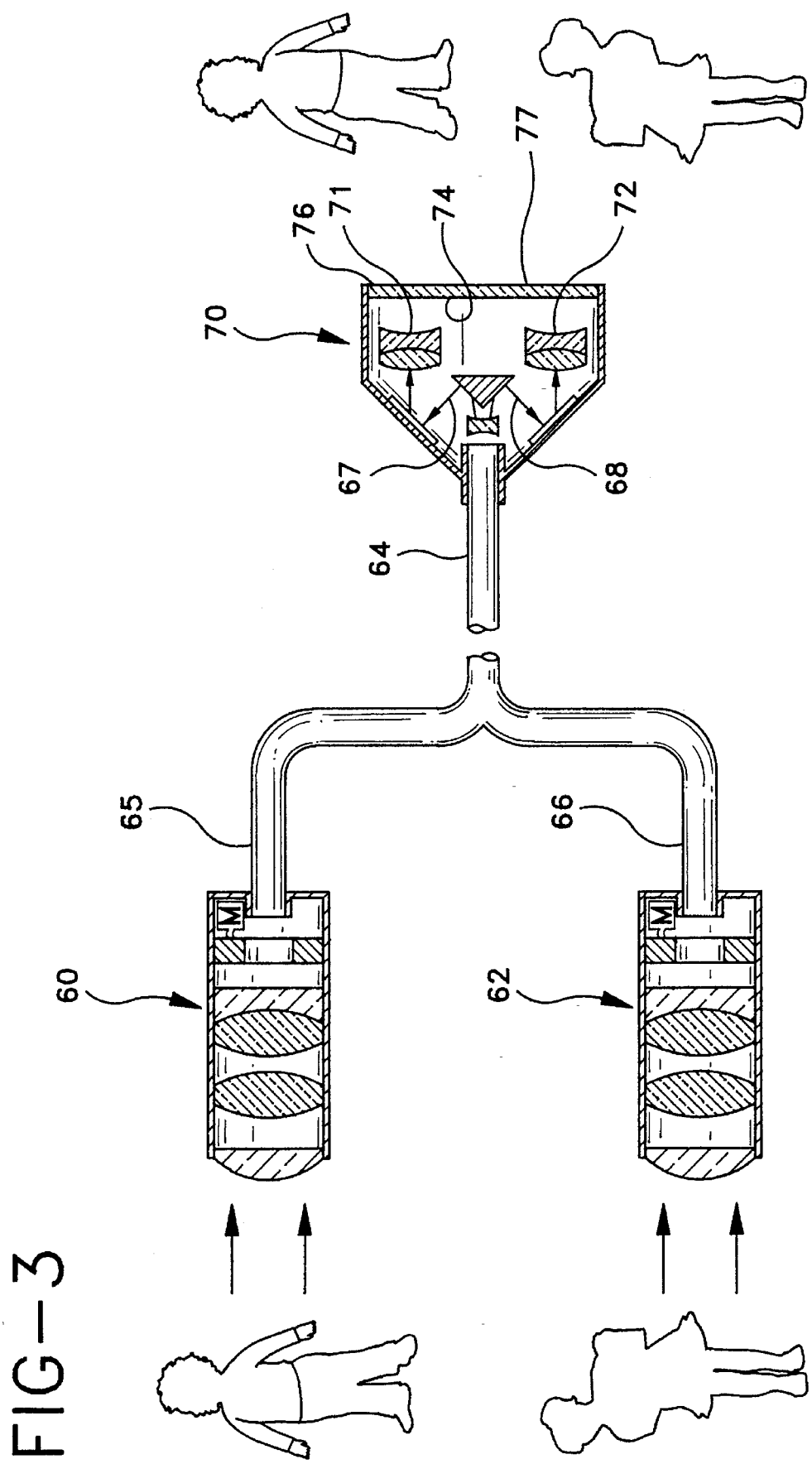
FIG. 3 shows a cross-sectional view of an alternate embodiment of the present invention optical apparatus having multiple objective lens assemblies.

Referring to FIG. 3, an alternate embodiment of the present invention is shown, wherein two separate objective lens assemblies 60, 62 are used together. With multiple objective lens assemblies, each of the objective lens assemblies 60, 62 may be positioned at different regions of the automobile. For instance, the first objective lens assembly 60 may be located proximate the right rear corner of the automobile while the second objective lens assembly 62 may be positioned proximate the left rear corner of the automobile. With multiple objective lens assemblies 60, 62, separate and distinct blind spot regions can be viewed simultaneously, thereby further enhancing the driver's field of view.

In the shown embodiment of FIG. 3, each of the objective lens assemblies 60, 62 have the same overall construction as was previously described in conjunction with the objective lens assembly of FIG. 2. The fiber optic conduit 64 of the shown embodiment divides into two branch conduits 65, 66, wherein each of the branch conduits 65, 66 couples to one of the objective lens assemblies 60, 62 and receives an emitted image therefrom. The two branch conduits 65, 66 combine into the main body of the fiber optic conduit. As a result, the fiber optic conduit 64 propagates the images collected by both objective lens assemblies 60, 62 into the rearview mirror assembly 70. Once within the rearview mirror assembly 70, the output image emitted from the fiber optic conduit 64 is divided along two separate optical paths 67, 68. Each of the optical paths 67, 68 contains the image viewed by one of the objective lens assemblies 60, 62. As such, the image in the optical paths 67, 68 is different with each of the separate images corresponding to what is in the field of view for each of the objective lens assemblies 60, 62. A focusing lens arrangement 71, 72 is positioned along each of the optical paths 67, 68. The focusing lens arrangements 71, 72 focus the light contained within each optical path 67, 68 onto separate areas of the back surface 74 of the mirror plate 76. One image is projected onto a first half of the mirror plate 76, while the other image is projected onto the second half of the mirror plate 76. An opaque line 77 may be disposed on the back surface 74 of the mirror plate 76 to help the driver recognize the separation between the two images when viewing the rearview mirror assembly 30. As with the previous embodiment, the back surface of the mirror plate 76 is not highly polished. Consequently, the images projected onto the back surface 74 of the mirror plate 76 are visible by looking through the mirror plate 76. It should be understood that any plurality of objective lens assemblies may be used depending upon how many separate regions need to be viewed. The image of each objective lens assembly can then be shown in the rearview mirror as a head-up display.

Figure 4:
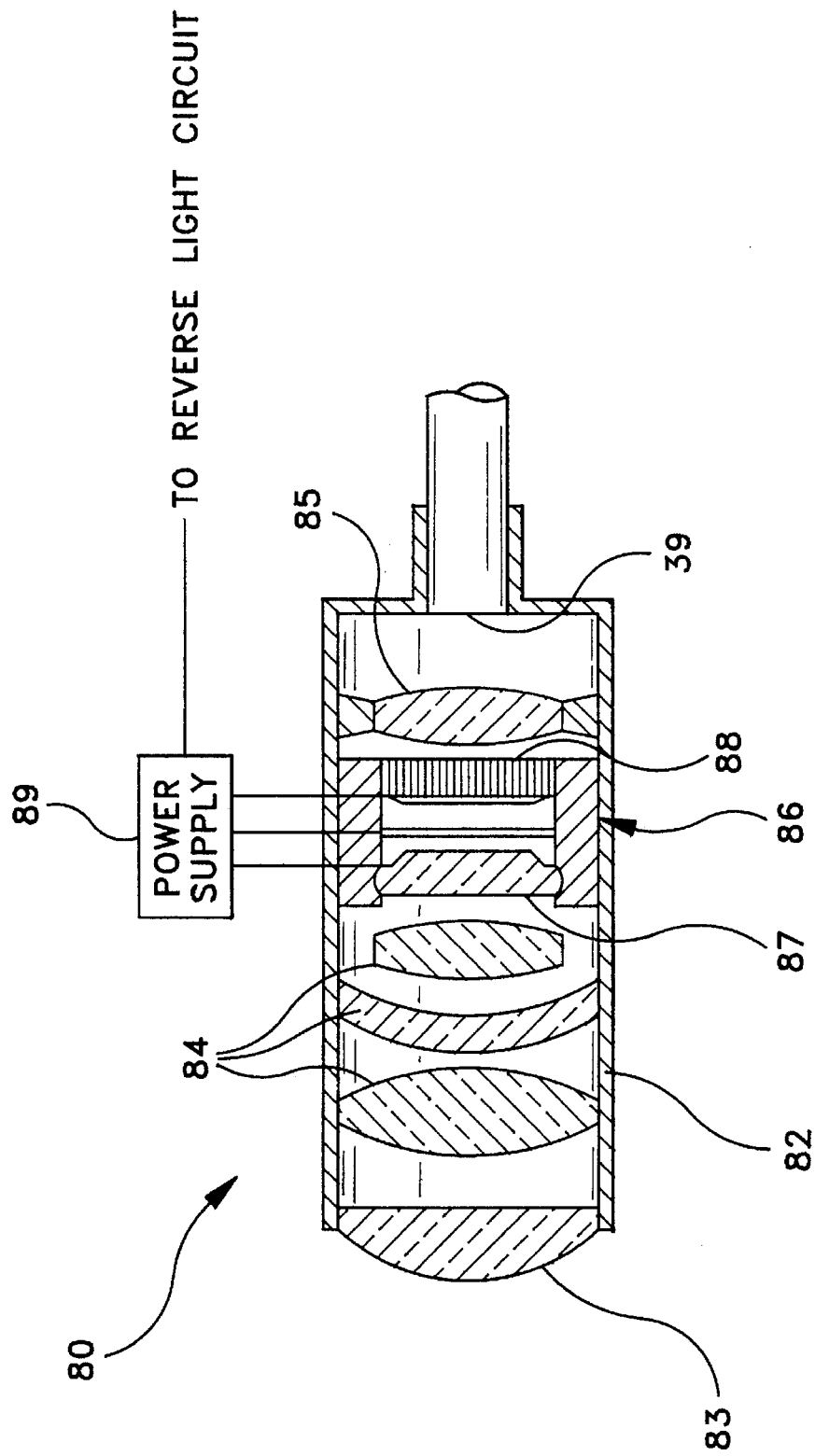
FIG. 4 shows a cross-sectional view of an alternate construction for the objective lens assembly component of the present invention optical apparatus.

Referring to FIG. 4, there is shown an alternate embodiment for the construction of the objective lens assembly. The objective lens assembly 80 includes a housing 82 that retains an objective lens 83 and a focusing lens arrangement 84, as in previous embodiments. However, an image intensifier tube 86 is now contained within the assembly. Image intensifier tubes are well known, commercially available electro-optical components that amplify the intensity of visible light or convert infrared light into amplified visible light. In the embodiment shown, the focusing lens arrangement 84 focuses light onto the input plate 87 of the image intensifier tube 86. The image intensifier tube 86 amplifies the intensity of the impinging light and emits a much more intense image from its output screen 88. A focusing lens 85 then focuses the image of the output screen 88 onto the input plane 39 of the image conduit. The use of the image intensifier tube 86 greatly increases the brightness of the image sent through the image conduit. As a result, the use of an image intensifier tube greatly enhances the performance of the present invention optical system during low light applications. Similarly, depending upon the type of image intensifier tube used, the image intensifier tube may add night vision capabilities to the present invention optical system, thereby enabling a driver to see areas around the automobile even in complete darkness.

Image intensifier tubes are electrically operated devices that require a specialized power supply 89. If the image intensifier tube 86 is not empowered, no light passes through its structure. As a result, by coupling the power supply 89 to the reverse lights of the automobile, the power supply 89 can be selectively activated when the automobile is in reverse. Alternatively, a separate drive operated ON/OFF switch may be used. Consequently, when the power supply 89 is disabled and the image intensifier tube 86 can no longer transmit light, there is no need for an electrically controlled aperture shown in previous embodiments.

Figure 5:
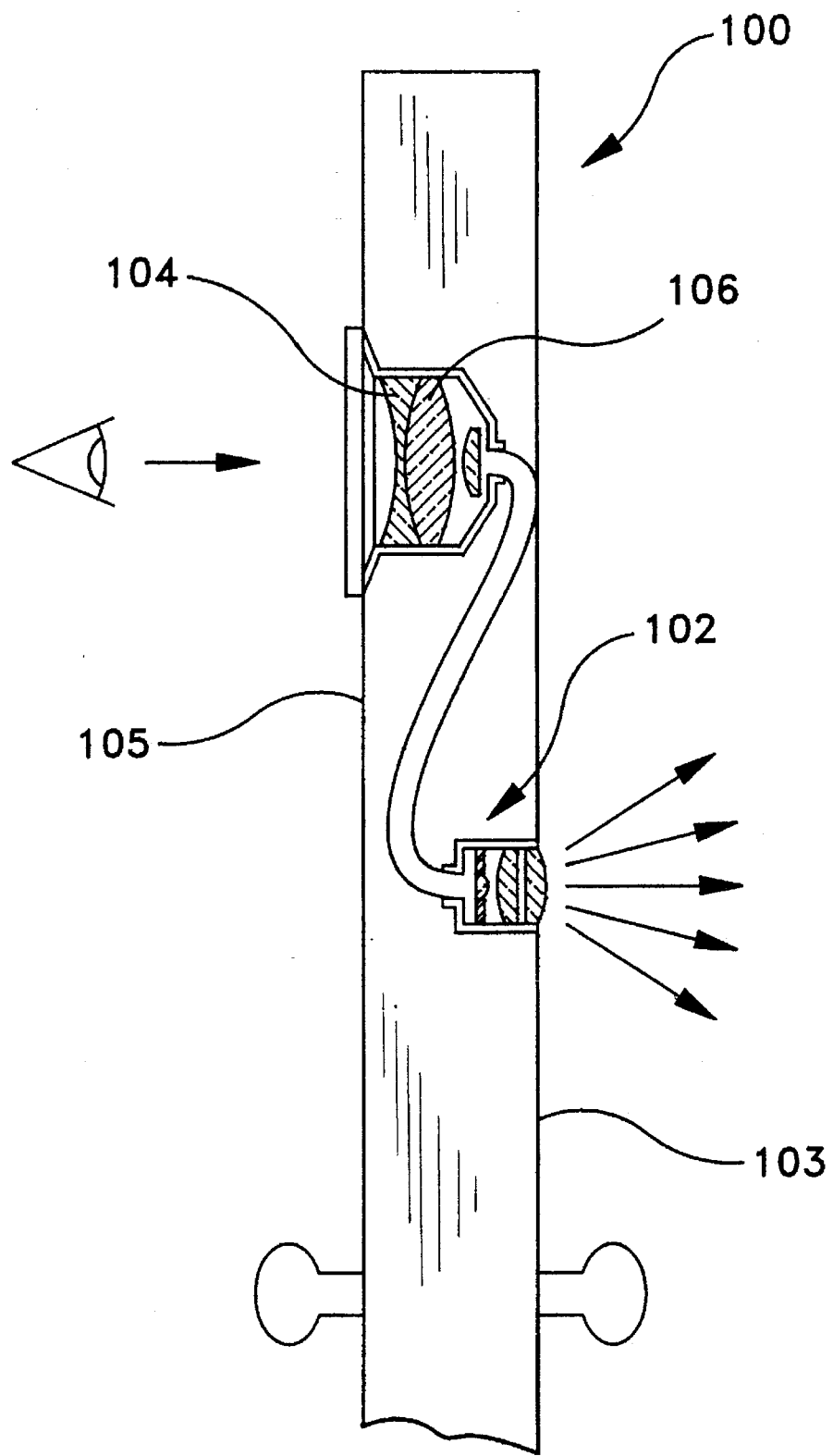
FIG. 5 shows the present invention optical apparatus in conjunction with a door to illustrate an alternate application for the purposes of further consideration and discussion.

Referring now to FIG. 5, there is shown a different application for the present invention optical system. In this figure, the present invention optical system is applied to a door 100. The objective lens assembly 102 extends through the outside surface 103 of the door 100 so as to be directed toward any person that may approach the door 100. A large translucent plate 104 is positioned on the inside surface 105 of the door 100. The focusing lens arrangement 106 associated with the translucent plate 104 is positioned behind the translucent plate 104. The image conduit 110 couples the objective lens assembly 102 to the focusing lens arrangement 106 within the confines of the door 100. The optical system shown operates in the same manner as described with previous embodiments. However, the rearview mirror assembly of previously described embodiments is now replaced by a large door mounted translucent plate 104. The translucent plate 104 consequently displays a relatively large image of the opposite side of the door 100. This allows a person to clearly and easily view the presence of a person who has approached the door, thus eliminating the need to look through a small peep hole at a small distorted image. This construction also has the advantage of preventing a person on the other side of the door from noticing that they are being viewed through the peep hole.

Although the described embodiments of the present invention are believed to represent the best mode of the present invention, it should be understood that many described components of the present invention have known functional equivalents. Additionally, orientations, proportions and shapes used within the description may be modified by a person skilled in the art. More particularly, although the present invention shows specific focusing lenses, many other lens configurations can be used and the invention so practiced. All such modifications and deviations are intended to be covered by the scope of the invention as set forth in the appended claims.

What is claimed is:

1. In a vehicle having a reverse gear setting and a blind spot behind the vehicle that can not be seen by the operator of the vehicle when sitting within the vehicle, an optical system for viewing the blind spot, comprising:

at least one objective lens arrangement coupled to said vehicle, wherein said at least one objective arrangement is oriented to view the blind spot;

a rear view mirror assembly disposed within said vehicle, said rear view mirror assembly including:

a focusing lens arrangement; and an imaging plane disposed proximate said focusing lens arrangement, said imaging plane having a front surface viewable from within the vehicle and a rear surface oriented toward said focusing lens arrangement, wherein said front surface of said imaging plane appears substantially reflective from within said vehicle when second surface is not illuminated from said focusing lens arrangement; and an image conduit coupling said at least one objective lens arrangement to said rear view mirror assembly at a point proximate said focusing lens arrangement, wherein an image of the blind spot, viewed by said at least one objective lens arrangement, is capable of being propagated across said image conduit and directed toward said focusing lens arrangement, and said focusing lens arrangement focuses the image onto said rear surface of said imaging plane for viewing through said imaging plane; and an optical diaphragm operationally coupled to the reverse gear setting of the vehicle for selectively changing the system between an ON condition when the vehicle is in the reverse gear setting, wherein the image from said at least one objective lens impinges upon said rear surface of said imaging plane, and an OFF condition when the vehicle is not in the reverse gear setting, wherein the image from said at least one objective lens is obscured prior to reaching said imaging plane.

2. The optical system according to claim 1, wherein said image conduit has an input end and an output end and said at least one objective lens arrangement includes both an objective lens, that accepts an impinging image from an object, and at least one focusing lens that focuses the image onto said input end of said image conduit, whereby the image is propagated to said output end of said image conduits, when in said ON condition.

3. The optical system according to claim 2, further including an image intensifying means for amplifying the intensity of the image impinging upon said input end of said image conduit.

4. The optical system according to claim 1, wherein said imaging plane is a substantially transparent plate, wherein said focusing lens arrangement focuses the image on said rear surface of said imaging plane thereby making the image visible through said imaging plane.

5. The optical system according to claim 1, having multiple objective lens arrangements for receiving multiple impinging images wherein each of the images is simultaneously displayed on separate regions of said imaging plane.

6. In an automobile that is operational in a forward moving condition and a reverse moving condition, an optical arrangement for viewing at least one target region proximate an automobile, comprising:

at least one objective lens arrangement coupled to the automobile at a position where said at least one objective lens arrangement views an image of said at least one target region;

a rearview mirror assembly disposed within the automobile;

an image conduit coupling said at least one objective lens arrangement to said rearview mirror assembly, wherein the image viewed of said at least one target region is displayed within said rearview mirror assembly; and an electrically controlled optical diaphragm disposed in said at least one objective lens arrangement, wherein said electrically controlled optical diaphragm selectively obscures the image viewed by said at least one objective lens arrangement when the automobile is in said forward moving condition and enables the image to be viewed in said rearview mirror assembly when the automobile is in said reverse moving condition.

7. The optical arrangement according to claim 6, wherein said image conduit has an input end and an output end and said at least one objective lens arrangement includes at least one focusing lens that focuses the image of said at least one target region onto said input end of said image conduit, whereby the image is propagated to said output end in said rearview mirror assembly.

8. The optical arrangement according to claim 7, wherein said rearview mirror assembly includes a planar member plate having a front surface and a back surface, wherein the image emanating from said output end of said image conduit impinge upon said back surface of said planar member and can be viewed by looking said front surface of said planar member.

9. The optical arrangement according to claim 6, further including an image intensifying means disposed in said at least one objective lens arrangement wherein said image intensifier means increases the optical intensity in the visual spectra that is associated with the image viewed by said at least one objective lens arrangement.

10. In a vehicle having a rear view mirror assembly, a reverse gear setting and a forward gear setting, a method of providing a viewable image of a blind spot behind a vehicle to a person operating the vehicle, comprising the steps of:

positioning an objective lens assembly on the vehicle, wherein said objective lens assembly views the blind spot;

focusing the image viewed by said objective lens assembly onto a first end of an image conduit that extends from said first end proximate said objective lens assembly to a second end within said rearview mirror assembly, wherein the image viewed by said objective lens assembly is propagated through said image conduit from said first end to said second end;

viewing the image of said blind spot through said rearview mirror assembly when said vehicle is in said reverse gear setting; and providing an optical diaphragm within said at least one objective lens arrangement that is operationally controlled by said reverse gear setting, wherein said optical diaphragm is selectively controlled to prevent the image viewed by said at least one objective lens arrangement from being received by said image conduit when the vehicle is in said forward gear setting.

11. The method according to claim 10, wherein the image viewed by said objective lens assembly has a given intensity and said method further includes the step increasing the intensity of the image before the image is focused onto said first end of said image conduit.

* * * * *